US009804649B2

(12) United States Patent
Cohen et al.

(10) Patent No.: US 9,804,649 B2
(45) Date of Patent: Oct. 31, 2017

(54) SYSTEMS AND METHODS OF REMOTE COMMUNICATION

(75) Inventors: Daniel C. Cohen, Newton, MA (US); Mark R. Melanson, Chelmsford, MA (US); James S. Spitaels, Shrewsbury, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 130 days.

(21) Appl. No.: 14/369,542

(22) PCT Filed: Dec. 30, 2011

(86) PCT No.: PCT/US2011/068113
§ 371 (c)(1),
(2), (4) Date: Jun. 27, 2014

(87) PCT Pub. No.: WO2013/101186
PCT Pub. Date: Jul. 4, 2013

(65) Prior Publication Data
US 2015/0012763 A1    Jan. 8, 2015

(51) Int. Cl.
*G06F 1/26* (2006.01)
*H04L 29/08* (2006.01)
(Continued)

(52) U.S. Cl.
CPC .............. *G06F 1/263* (2013.01); *G06F 1/266* (2013.01); *H04L 41/00* (2013.01); *H04L 43/045* (2013.01);
(Continued)

(58) Field of Classification Search
CPC ............... G06F 1/00; G06F 1/26; G06F 1/263
(Continued)

(56) References Cited

U.S. PATENT DOCUMENTS 6,640,140 B1    10/2003  Lindner et al.
7,100,054 B2 *   8/2006  Wenisch ................. G06F 21/31
                                                      713/185
(Continued)

FOREIGN PATENT DOCUMENTS

EP           1380377 A2    1/2004

OTHER PUBLICATIONS

Notification of Transmittal of the International Search Report and the Written Opinion of the International Searching Authority from corresponding PCT/US2011/068113 dated Apr. 30, 2012.
(Continued)

*Primary Examiner* — Vincent Tran
(74) *Attorney, Agent, or Firm* — Lando & Anastasi, LLP

(57) ABSTRACT

A system comprising at least one power device is provided. The at least one power device includes an input to receive power from a power source, an output operatively coupled to the input and configured to provide power, a data storage, a network interface, and a controller coupled to the input, the output, the data storage and the network interface. The controller is configured to provide, according to a reporting schedule, identification information directly to a cloud service via the network interface and provide, according to the reporting schedule, secured information directly to the cloud service, the secured information being descriptive of performance of the at least one power device.

21 Claims, 12 Drawing Sheets

(51) Int. Cl.
   *H04L 12/26* (2006.01)
   *H04L 12/24* (2006.01)
(52) U.S. Cl.
   CPC ........ *H04L 67/125* (2013.01); *H04L 41/5096* (2013.01); *Y04S 40/168* (2013.01)
(58) Field of Classification Search
   USPC .......................................................... 713/310
   See application file for complete search history.

(56) References Cited

U.S. PATENT DOCUMENTS

| | | | |
|---|---|---|---|
| 7,446,433 B2 | 11/2008 | Masciarelli et al. | |
| 7,711,814 B1 | 5/2010 | Emerick et al. | |
| 7,796,589 B2* | 9/2010 | Cohen | H04L 67/025 370/389 |
| 8,476,787 B2 | 7/2013 | Spitaels et al. | |
| 8,595,524 B2 | 11/2013 | Kamijima | |
| 8,819,170 B2 | 8/2014 | Cohen et al. | |
| 2002/0138785 A1* | 9/2002 | Hammond | H02J 9/00 714/14 |
| 2004/0215693 A1* | 10/2004 | Thompson | G08C 19/00 709/201 |
| 2005/0035105 A1* | 2/2005 | Spear | B23K 9/095 219/130.5 |
| 2005/0268122 A1* | 12/2005 | Young | H04L 12/10 713/300 |
| 2006/0050465 A1* | 3/2006 | Cho | H02J 9/061 361/118 |
| 2006/0206741 A1* | 9/2006 | Allison | G06F 1/266 713/340 |
| 2008/0077425 A1 | 3/2008 | Johnson et al. | |
| 2010/0115065 A1* | 5/2010 | Thompson | H04L 41/0853 709/220 |
| 2010/0250160 A1* | 9/2010 | Spitaels | G05B 15/02 702/61 |
| 2010/0250162 A1 | 9/2010 | White et al. | |
| 2011/0054710 A1 | 3/2011 | Imes et al. | |
| 2013/0018979 A1 | 1/2013 | Cohen et al. | |
| 2014/0258526 A1* | 9/2014 | Le Sant | H04L 43/08 709/224 |
| 2015/0012763 A1 | 1/2015 | Cohen et al. | |

OTHER PUBLICATIONS

Extended European Search Report from corresponding European Application No. 11878777.9 dated May 3, 2016.

* cited by examiner

SYSTEMS AND METHODS OF REMOTE COMMUNICATION

This application is a U.S. National Stage Application and claims priority under 35 U.S.C. §371 of International Application No. PCT/US2011/068113, filed Dec. 30, 2011, which is hereby incorporated herein by reference in its entirety.

BACKGROUND

Technical Field

The technical field relates generally to remote communications infrastructure and, more particularly, to remote devices that communicate with cloud services.

Background Discussion

Cloud computing services provide customers with access to scalable computing to resources, without requiring that the customers own dedicated computing equipment. To utilize cloud services efficiently, customers often employ an architecture in which devices remote from the cloud include substantial computing resources. For example, some conventional cloud solutions rely on a "concentrator" or "hub" that aggregates data from devices located in a particular geographic location, establishes communications with the cloud service, and transmits the aggregate data to the cloud service. Concentrators such as these are typically configured with software that stores configuration and security data for the devices locally within the concentrator and that queries the devices within the location using the configuration and security data. Concentrators require substantial computing resources to store configurations of devices to which they attach and to distribute processing from the cloud service and into the local network to achieve reliability and system scalability.

In some conventional cloud architectures, each remote device executes an interface component, such as a local web page or other user interface, through which the remote device receives data about the user of the device. This user data is combined with data descriptive of the remote device and is provided to a concentrator that provides the combined data to the cloud service. The cloud service, in turn, stores the combined data locally and processes the combined data by executing one or more applications. In some instances, these applications interact with the user via web pages served by the cloud service, and the cloud service transmits modified portions of the combined data to the concentrator. In other instances, processes running on remote servers determine the need to send data to remote devices and request that the cloud service send modified data to the remote devices via concentrator. Depending on the content of the modified portions, the concentrator may provide the modified portions to one or more remote devices. Thus, under these architectures, the remote device may be administered both locally and via the cloud service.

SUMMARY

In at least one embodiment, a system comprising at least one power device is provided. The at least one power device includes an input to receive power from a power source, an output operatively coupled to the input and configured to provide power, a data storage, a network interface, and a controller coupled to the input, the output, the data storage and the network interface. The controller is configured to provide, according to a reporting schedule, identification information directly to a cloud service via the network interface and provide, according to the reporting schedule, secured information directly to the cloud service, the secured information being descriptive of performance of the at least one power device.

The system may include a user interface mounted on the at least one power device. The user interface may consist of a switch configured to control communications between the at least one power device and the cloud service. The controller may be further configured to establish communication with the cloud service responsive to detection that a value of report information is in a predetermined relationship with a threshold value. The controller may be further configured to establish communication with the cloud service according to a communication schedule. The communication schedule may specify a continuously repeating time interval.

The system may include the cloud service. The cloud service may include at least one computer system configured to receive identification information from the at least one power device, receive the secured information from the at least one power device, identify a key using the identification information, and decode the secured information using the key. In the system, the at least one computer system may be further configured to provide a user interface, receive user information via the user interface, and associate the user information with historical information associated with the identification information and previously received in a separate communication from the at least one power device.

The system may further include a network address translation device and the at least one power device may include a plurality of power devices being serviced by the network translation device. In this example, the at least one computer system may be configured to identify the plurality of power devices as having a same internet protocol address and associate, responsive to identifying the plurality of power devices as having the same internet protocol address, the user information with identification information for each of the plurality of power devices. The at least one computer system may be further configured to provide an authentication challenge via the user interface and receive an authentication response.

According to another embodiment, a method of transmitting data from a power device to a cloud service is provided. The method includes acts of providing, by the power device according to a reporting schedule, identification information directly to a cloud service via the network interface and providing, by the power device according to the reporting schedule, secured information directly to the cloud service, the secured information being descriptive of performance of the at least one power device.

The method may further include an act of establishing communication with the cloud service according to a communication schedule. The act of establishing communication may include establishing communication according to a continuously repeating time interval. The method may further include an act of receiving configuration information from the cloud service. The method may further include acts of receiving, by at least one computer system provided by the cloud service, identification information from the at least one power device; receiving, by the at least one computer system, the secured information from the at least one power device; identifying a key using the identification information; and decoding the secured information using the key.

The method may further include acts of providing, by the at least one computer system, a user interface, receiving user information via the user interface, and associating the user information with historical information associated with the identification information and previously received in a separate communication from the at least one power device. The method may further include acts of identifying a plurality of power devices as having a same internet protocol address and associating, responsive to identifying the plurality of power devices as having the same internet protocol address, the user information with identification information for each of the plurality of power devices. The method may further include acts of providing an authentication challenge via the user interface and receiving an authentication response.

According to another embodiment, a non-transitory computer readable medium is provided. The computer readable medium has stored thereon sequences of instruction for transmitting data from a power device to a cloud service. The sequences of instruction include instructions that will cause at least one processor of a power device to provide, according to a reporting schedule, identification information directly to a cloud service via the network interface and provide, according to the reporting schedule, secured information directly to the cloud service, the secured information being descriptive of performance of the at least one power device.

The instructions may further instruct the at least one processor to establish communication with the cloud service according to a communication schedule. The instructions may also further instruct the at least one processor to receive configuration information from the cloud service.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
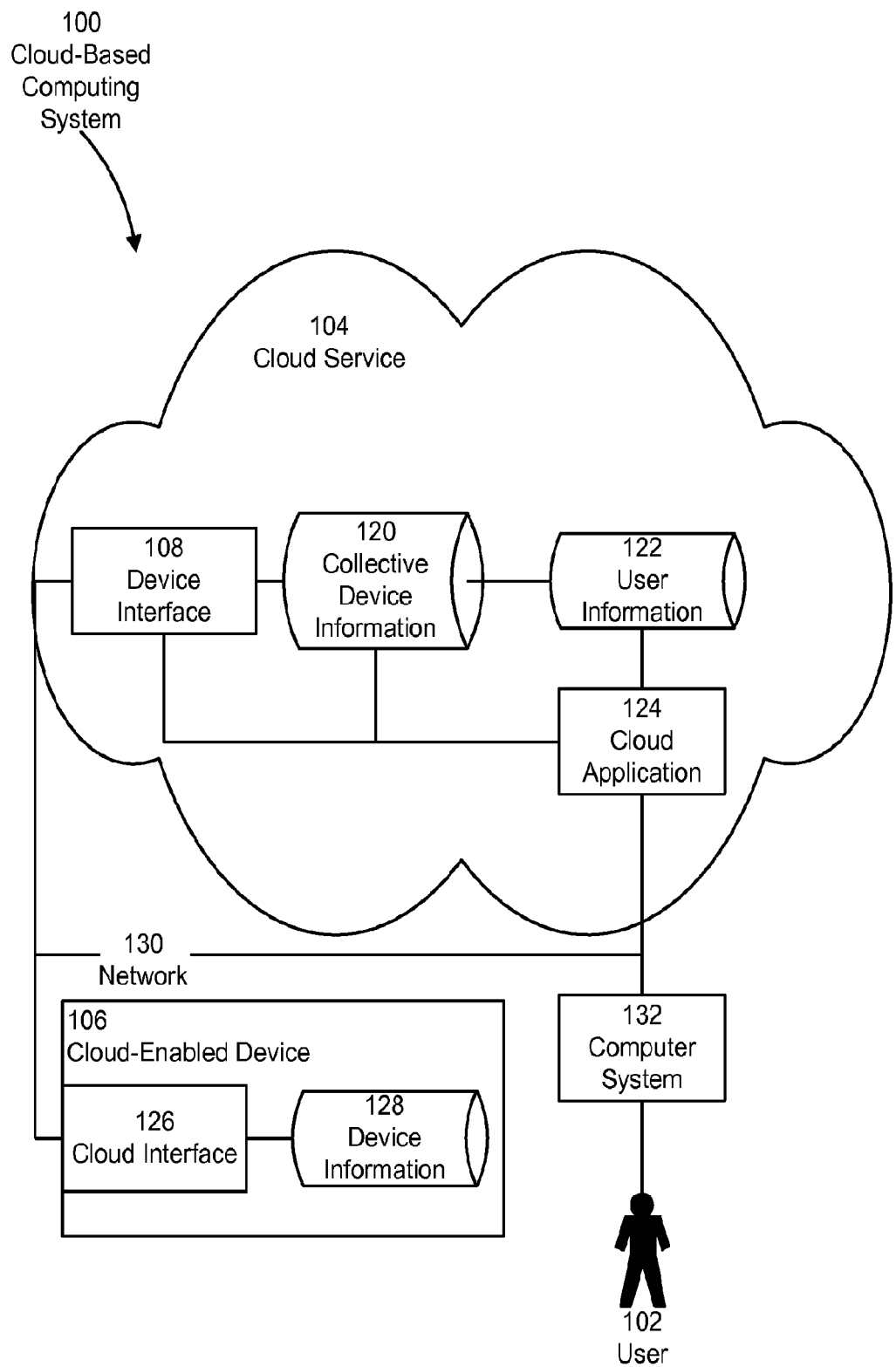
FIG. 1 is a schematic context diagram of a system including a cloud-enabled device.

At least one embodiment disclosed herein includes apparatus and processes for implementing a cloud-based processing model that decreases the overall cost of implementing cloud-based computing systems. For example, according to one embodiment, the cost of individual cloud-enabled devices is reduced by manufacturing, configuring, and managing cloud-enabled devices with little or no resources designed to perform user interface functions. In this embodiment, the user interface functions that are conventionally performed by the cloud-enabled device before the device connects to the cloud are instead performed by applications executing within a cloud service. Further, according to this embodiment, the need for a concentrator is eliminated, thereby further decreasing the cost of the overall cloud solution.

In other embodiments, one or more cloud-enabled devices automatically report information available to the cloud-enabled devices to the cloud service. This report information may include information descriptive of the performance, status, and environment of the cloud-enabled devices, as well as control information descriptive of actions the cloud-enabled devices have taken in the past or have been requested to take in the future.

In some embodiments, cloud-enabled devices provide report information to the cloud service directly, i.e., without the report information being summarized or otherwise manipulated by an intermediate computer system, such as a concentrator or aggregator. Further, in some of these embodiments, the cloud service receives and aggregates the report information into a data storage, such as a data warehouse, for future analysis and reporting. This information may be used by product management and support personal to gain insight into how customers use the cloud-enabled devices and how the cloud-enabled devices perform in the field, thereby informing their product roadmaps and call resolution activities. In addition, this information may be used to analyze controlled equipment, industrial process performance, energy usage, battery performance, environmental conditions, and other information accessible to cloud-enabled devices.

In some embodiments, the process of reporting information is decoupled from the process of associating cloud-enabled devices with users. This decoupling allows cloud-enabled devices to transmit unassociated report information prior to the cloud-enabled devices being associated with users.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Cloud-Based Computing System

Various embodiments disclosed herein implement a cloud-based computing system using one or more computer systems and one or more cloud-enabled devices. As described further below, the cloud-based computing system manages and monitors the operation of one or more cloud-enabled devices. FIG. 1 illustrates an exemplary cloud-based computing system 100. As shown, FIG. 1 includes a user 102, a cloud service 104, a cloud-enabled device 106, a computer system 132, and a communication network 130. Although only one computer system 132 is shown in FIG. 1, embodiments disclosed herein may interact with one or more users via one or more computer systems, such as the computer system 132. In addition, although only one cloud-enabled device 106 is shown in FIG. 1, embodiments disclosed herein are not limited to a particular number of cloud-enabled devices and several embodiments include multiple cloud-enabled devices of various types. For instance, at least one embodiment includes cloud-enabled UPSs and cloud-enabled ACDs. In addition, other embodiments may include additional types of cloud-enabled devices. Examples of particular types of cloud-enabled devices are described further below within the Cloud-Enabled Devices section.

As illustrated in FIG. 1, the cloud service 104 and the cloud-enabled device 106 exchange (i.e. send or receive) information via the network 130. For instance, the cloud-enabled device 106 may transmit report information, such as identification, configuration, environmental, control, or performance information, to the cloud service 104 through the network 130. Conversely, the cloud service 104 may transmit configuration or control information to the cloud-enabled device 106 via the network 130. The network 130 may include any communication network through which computer systems exchange information. For example, the network 130 may be a public network, such as the internet, and may include other public or private networks such as LANs, WANs, extranets, and intranets.

Also as depicted in FIG. 1, the cloud-enabled device 106 includes a cloud interface 126 and a device information data storage 128. As shown, the cloud interface 126 exchanges information with the device information data storage 128.

The device information data storage 128 includes a variety of data structures and data elements that store information descriptive of the cloud-enabled device 106. Examples of the information stored in the device information data storage 128 include identification information representative of a device name of the cloud-enabled device 106, a serial number of the cloud-enabled device 106, a stock-keeping unit ("SKU") number of the cloud-enabled device 106, a model number of the cloud-enabled device 106, an internet protocol ("IP") address of the cloud-enabled device 106, and a media access control ("MAC") address of a network interface of the cloud-enabled device 106. In at least one embodiment the cloud-enabled device uses a combination of serial number and SKU to generate a unique identifier of the cloud enabled device 106. In some embodiments, the device information data storage 128 also stores configuration information representative of a version of firmware loaded on the cloud-enabled device 106, a version of one or more hardware components included in the cloud-enabled device 106, an identifier of a cloud service, such as the cloud service 104, (e.g., a universal resource locator ("URL"), domain name, or IP address), authentication information for gaining access to the cloud service (e.g., security keys), schedule information defining the regularity with which information should be exchanged between the cloud-enabled device 106 and the cloud service (e.g., communication interval and reporting interval), information descriptive of events of importance that cause the cloud-enabled device 106 to transmit information, and information specifying the user interface elements used by a cloud application, such as the cloud application 124, to display information associated with the cloud-enabled device 106. The communication interval may specify a period of time that should pass between attempts to establish communications with the cloud service. The reporting interval may specify a period of time that should pass between attempts to provide report information to the cloud service. Both the reporting interval and the communication interval may be configured to have unlimited duration (i.e., to never expire) thus causing the cloud-enabled device 106 to not initiate communication with the cloud service except to report an event of importance. Such events are described further below with reference to FIG. 5. Other examples of information stored within the device information data storage 128 include information descriptive of the environment within which the cloud-enabled device 106 resides (e.g., temperature and humidity information) and control information (i.e., information that triggers a cloud-enabled device 106 to perform a function, such as a power outage, a shutdown or self-test). Control information may also include other information provided by the cloud service that is required for the cloud-enabled devices to perform requested actions. For example, if a cloud-enabled device has been requested to manage utility costs, the control information may include an occupancy schedule and an energy cost schedule. Other examples of control information include ambient temperature information and holiday schedule information.

In other embodiments, the device information data storage 128 also stores information descriptive of the performance of the cloud-enabled device 106. Examples of this performance information may vary depending on the functions provided by the cloud-enabled device 106. In one example where the cloud-enabled device 106 is a cloud-enabled UPS, examples of the performance information may include efficiency information, power quality information, and remaining battery life. In another embodiment where the cloud-enabled device 106 is a cloud-enable ACD, examples of performance information may include process variable values and summaries (e.g., average, high, low) thereof, ladder logic that the cloud-enabled device 106 is configured to execute, and data descriptive of one or more industrial processes managed by the ACD. In both examples, the performance information may further include information descriptive of a current state of the cloud-enabled device 106 (e.g., information indicating whether the cloud-enable device 106 is actively managing an industrial process, supplying online power, supplying battery power, etc.), diagnostic information that may be used to determine how the cloud-enabled device 106 entered its current state, alerts generated where underlying performance, environmental or control information transgresses a threshold value during the operation of the cloud-enabled device 106, and other historical information regarding the cloud-enabled device 106. Cloud-enabled UPSs and ACDs are described further below.

The cloud interface 126, as shown in FIG. 1, is configured to communicate with a device interface, such as the device interface 108, via the network 130. The cloud interface 126 may employ a variety of protocols to exchange information with cloud interface. For instance, in one embodiment, the cloud interface 126 communicates with the device interface using hypertext transfer protocol ("HTTP"). In another embodiment, the cloud interface 126 communicates with the device interface using the "Request/Response Protocol" described in U.S. patent application Ser. No. 13/182,723, entitled "COMMUNICATION PROTOCOLS," filed Jul. 14, 2011 ("the '723 Application"), which is hereby incorporated herein by reference in its entirety. The cloud interface 126 exchanges a variety of information with the device interface. This information may include any of the information described above with reference to the device information data storage 128. One exemplary process executed by the cloud interface 126 is described further below with reference to FIG. 6.

In some embodiments, the cloud interface 126 is configured to isolate performance functions (e.g., industrial process control functions performed by a cloud-enabled ACD) from information reporting functions. For instance, according to one embodiment, the cloud interface 126 provides information to a cloud service, such as the cloud service 104, using a one-way, unicast message that includes information in conformity with the interface specifications of the cloud service. Further, in this embodiment, the cloud interface 126 does not process messages from the cloud service (e.g., the cloud interface 126 does not receive configuration information from the cloud service). By implementing this one-way communication protocol with the cloud service, the cloud interface 126 prevents reporting functions from interfering with the operational performance of the cloud-enabled device. Moreover, by not processing messages transmitted from the cloud service, the cloud interface 126 provides an additional level of security in that messages from the cloud service cannot be used to gain authorized access to the cloud-enabled device.

In other embodiments, the cloud interface 126 is configured to receive configuration information specifying how the cloud interface 126 is to interact with a cloud service, such as the cloud service 104. In these embodiments, the cloud interface 126 receives configuration information generated from a local user interface, such a as a physical switch (e.g., a key switch) or text menu. This configuration information indicates whether the cloud interface 126 is to not communicate with the cloud service at all, is to communicate using the one-way protocol discussed above, or is to communicate bi-directionally with the cloud service. When communicating bi-directionally, the cloud-interface 126 may send or receive any information described above with reference to the device information data storage 128. In other embodiments, the configuration information generated from the local user interface may limit the operation of the cloud interface 126 in other ways and embodiments are not limited to the three options described above.

In some embodiments, the cloud interface 126 monitors and transmits information as warranted by the importance of the information, according to schedule information stored in a device information data storage, such as the device information data storage 128, or in accordance with a combination of these factors. For instance, in one example, the cloud interface 126 is configured to transmit information according to schedule information designed to minimize contention for network resources. According to this example, each of the cloud-enabled devices transmits information at a different offset but at the same time interval (e.g., different 15 minute offsets every hour). In another example, the cloud interface 126 transmits information according to the schedule information described above and also transmits information describing high importance events as quickly as possible. Examples of high importance events include imminent or extant failure of the cloud-enabled device 106, failure of the equipment controlled by the cloud-enabled device 106, the existence of an input that the cloud-enabled device 106 is not equipped to control (e.g., external temperature above a configured threshold, etc.) and the existence of a predetermined relationship between a value included in report information and a predetermined threshold (e.g., where the value transgresses the predetermined threshold). In at least one embodiment, information describing an event of high importance includes a data field populated with a value that indicates the importance of the information.

In some embodiments, the cloud interface 126 stores, aggregates and summarizes information prior to transmitting this information directly to a cloud service, such as the cloud service 104. Thus, unlike conventional systems, these embodiments do not include an intermediate device that serves as a data aggregator for the information. One example of a self-monitoring and reporting process executed by the cloud interface 126 is described further below with reference to FIG. 6.

In the embodiment illustrated in FIG. 1, the cloud service 104 includes several components: a device interface 108, collective device information data storage 120, user information storage 122, and cloud application 124. Although depicted as being stored in separate storage locations, collective device information data storage 120 and user information storage 122 may be stored on the same physical storage medium. As shown, the cloud application 124 exchanges information with the user 102, the device interface 108, and the device and user information data storages 120 and 122. The device interface 108 exchanges information with the cloud-enabled device 106 via the network 130 and the cloud interface 126. The device interface 108 also exchanges information with the collective device information data storage 120 and the cloud application 124. Also as shown, the cloud service 104 stores associations between discrete cloud-enabled devices (e.g., the cloud-enabled device 106) represented by information stored in the collective device information data storage 120 and discrete users (e.g., the user 102) represented by information stored in the user information data storage 122.

The user information data storage 122 includes a variety of data structures and data elements that store information descriptive of users of cloud-enabled devices, such as the user 102. Examples of the information stored in the user information data storage 122 include name, account number, employer, logon credentials, and contact information. In some embodiments, the user information data storage 122 also stores associations between users and cloud-enabled devices (e.g., the cloud-enabled device 106) that are represented within the collective device information data storage 120.

The collective device information data storage 120 includes a variety of data structures and data elements that store information descriptive of cloud-enabled devices, such as the cloud-enabled device 106. Examples of the information stored in the collective device information data storage 120 include identification information, configuration information, control information, environmental information, and performance information for each of one or more cloud-enabled devices that have communicated with the cloud service 104 via the device interface 108. In some embodiments, the collective device information data storage 120 also stores associations between cloud-enabled devices and users (e.g., the user 102) that are represented within the user information data storage 122. In other embodiments, the collective device data storage 122 stores information that associates a security key with each cloud-enabled device that has established communications with the cloud service. As is further described below with reference to FIG. 7, in some embodiments each security key is unique and generated based on random data.

Information within the cloud-based computing system 100, including data within the device information data storage 128, the user information data storage 122 and the collective device information data storage 120 may be stored in any logical construction capable of holding information on a computer readable medium including, among other structures, file systems, flat files, indexed files, hierarchical databases, relational databases or object oriented databases. Further, various embodiments organize the device information data storage 128, the user information data storage 122 and the collective device information data storage 120 into particularized and, in some cases, unique structures to perform the aspects and functions disclosed herein. In addition, these data structures may be specifically configured to conserve storage space or increase data exchange performance. The data may be modeled using unique and foreign key relationships and indexes. The unique and foreign key relationships and indexes may be established between various fields and tables to ensure data integrity.

Returning to the example illustrated in FIG. 1, the device interface 108 is configured to communicate with a cloud interface, such as the cloud interface 126, via the network 130. The device interface 108 may employ a variety of protocols to exchange information with the cloud interface. For instance, in some embodiments, the device interface 108 communicates with the cloud interface using HTTP. In at least one of these embodiments, the cloud interface 126 communicates with the device interface using the "Request/Response Protocol" described in the '723 Application. The device interface 108 exchanges a variety of information with the cloud interface. This information may include any of the information described above with reference to the collective device information data storage 120. One exemplary process executed by the device interface 108 is described further below with reference to FIG. 7.

As illustrated in FIG. 1, the cloud application 124 is configured to interact with the user 102 via the network 130 and the computer system 132. The cloud application 124 may employ a variety of metaphors and user interface elements to provide and receive information. Particular embodiments of the cloud application 124 are not limited to any one metaphor or configuration of user interface elements. For instance, in one embodiment, the cloud application 124 serves a browser-based user interface to the user 102 that is rendered by a web-browser running on the computer system 132.

The cloud application 124 exchanges a variety of information with the user 102. This information may include any of the information described above with reference to the user information data storage 122 and the collective device data storage 120. For instance, in one embodiment, the cloud application 124 provides a dashboard user interface as described below with reference to FIG. 12. In other embodiments, the cloud application 124 may present a user interface that mimics existing hardware and software interfaces (e.g., the interface provided by a Network Management Card ("NMC") such as a UPS NMC available from American Power Conversion Company ("APC"), the interface provided by Power Chute Business Edition available from APC), or the interface provided by an ACD. In some embodiments, the cloud application 124 is configured to issue an alert to a computer system, such as the computer system 132, in response to receiving information describing an event of high importance. In these embodiments, the alert issued by the cloud application 124 is communicated via one or more channels through which the cloud application 124 can communicate information to external entities, such as computer systems or telecommunication devices. Examples of such channels include email, text messaging, and automated telephone calls.

In some embodiments, multiple cloud applications, such as the cloud application 124, provide different information to different types of users. This information may include monitoring information describing the performance characteristics of one or more cloud-enabled devices, test information generated from periodic execution of tests by one or more cloud-enabled devices, customer use information generated by customer interaction with one or more cloud-enabled devices, service information generated by self-diagnostic activities executed by one or more cloud-enabled devices, and operation information generated by operational activity of one or more cloud-enabled devices. In some embodiments, the cloud applications may provide the performance characteristics to engineering users, customer use information to marketing users, service information to re-sellers, distributors, or service organizations, and operation information to customers. Other exemplary processes executed by the cloud application 124 are described further below with reference to FIGS. 8-10.

The cloud-based computing system 100 illustrated in FIG. 1 enables nearly ubiquitous access to centralized reporting of information from geographically diverse cloud-enabled devices via cloud computing technology. In providing this access, the cloud-based computing system 100 executes several processes that result in the transfer of information from cloud-enabled devices to a cloud service. One example of these processes is described further below with reference to FIG. 4.

Information may flow between the components illustrated in FIG. 1, or any of the elements, components and subsystems disclosed herein, using a variety of techniques. Such techniques include, for example, encapsulating and passing the information over a network using standard protocols, such as TCP/IP or HTTP, passing the information between modules in memory and passing the information by writing to a file, database, data store, or some other nonvolatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

The interfaces disclosed herein, which include both system interfaces and user interfaces, exchange (i.e., provide or receive) information with various providers and consumers. These providers and consumers may include any external entity including, among other entities, users and systems. In some embodiments, functions provided to systems by the system interfaces are also provided to users via the user interfaces. Conversely, in other embodiments, functions provided to users by the user interfaces are also provided to systems via the systems interfaces. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data or unauthorized access in the systems disclosed herein.

Embodiments disclosed herein are not limited to the particular configuration illustrated in FIG. 1. For example, some embodiments include multiple cloud services that operate in parallel to scale the computing resources available to the cloud-based computing system. In some examples, multiple users of different types access the same cloud-enabled device. In other examples, a single user accesses multiple cloud-enabled devices. Thus embodiments are not limited by a specific number of users, cloud-enabled devices, cloud services or cloud applications.

In addition, various embodiments utilize a variety of hardware components, software components and combinations of hardware and software components configured to perform the processes and functions described herein. For instance, in at least one embodiment, the cloud service 104 and the computer system 132 are implemented using a computer system, such as the computer systems described below with reference to FIG. 3. In other embodiments, the cloud service 104 is implemented using a distributed computer system, such as the distributed computer system described further below with regard to FIG. 3.

Cloud-Enabled Devices

Some embodiments include cloud-enabled devices that supply physical resources, such as power and cooling, to other equipment. Examples of the physical resources provided by these cloud-enabled devices include generators, uninterruptible power supplies ("UPSs"), transformers, power distribution units ("PDUs"), outlets, computer room air handlers ("CRAHs"), rack-mounted air conditioners ("RMACs") and computer room air conditioners ("CRACs"). The cloud-enabled devices disclosed here include enough computing resources to control the operation of the device, but these computing resources are limited and tailored to support the specific operations performed by the cloud-enabled device. In at least one embodiment, these limited computer resources may be disposed upon an NMC. In other embodiments, the limited computer resources are disposed elsewhere within the cloud-enable device.

Figure 2:
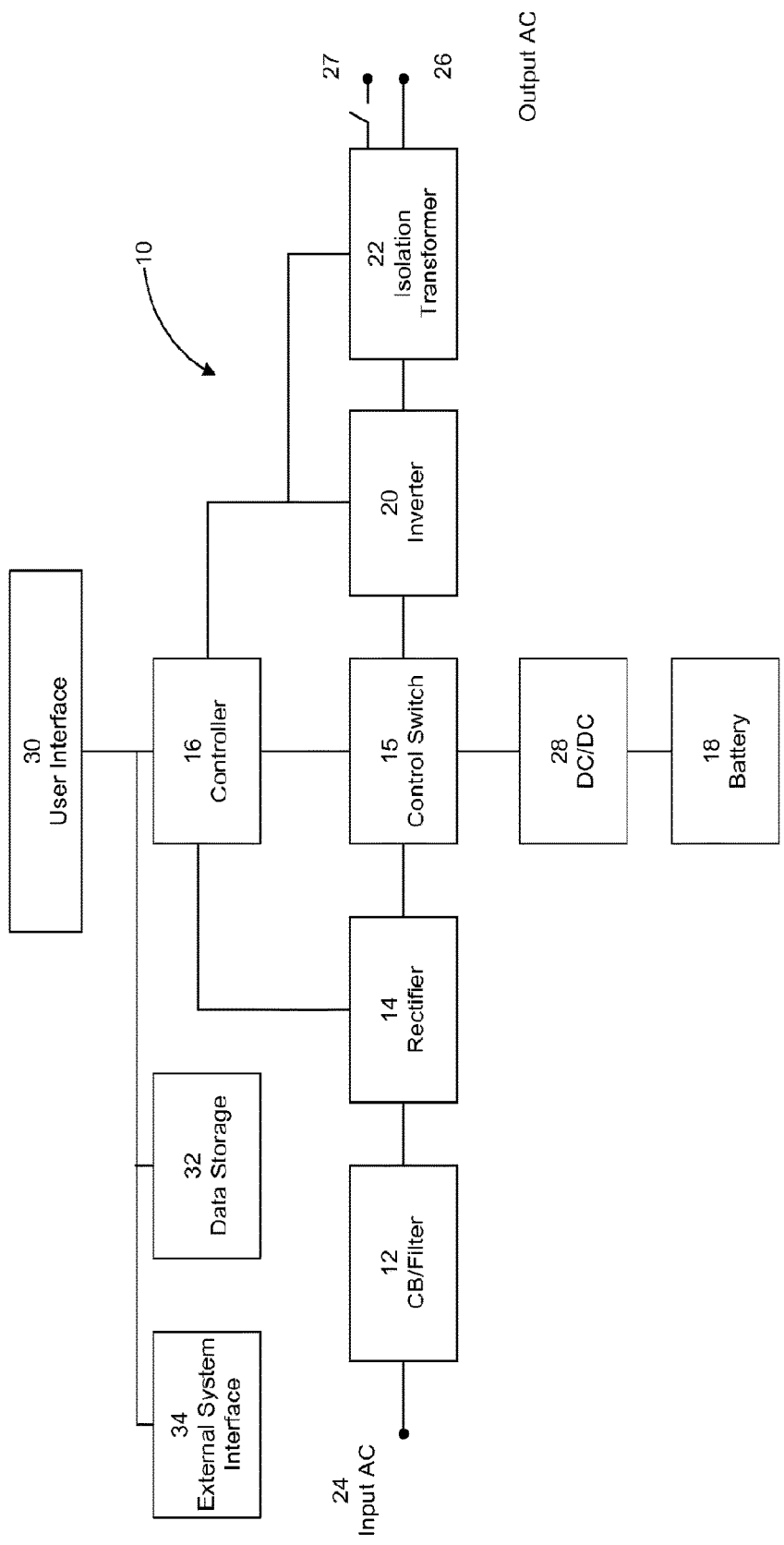
FIG. 2 is a schematic diagram of a cloud-enabled uninterruptible power supply ("UPS")

FIG. 2 shows an on-line UPS 10 used to provide regulated, uninterrupted power in accordance with one embodiment. The UPS 10 includes an input circuit breaker/filter 12, a rectifier 14, a control switch 15, a controller 16, a battery 18, an inverter 20, an isolation transformer 22, a DC/DC converter 28, a user interface (UI) 30, data storage 32 and external system interface 34. The UPS also includes an input 24 for coupling to an AC power source, and an outlet 26 for coupling to a load.

The UPS 10 operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the DC/DC Converter 28 to the inverter 20.

In an alternative embodiment, the battery is coupled to the rectifier circuit and the rectifier functions as a boost converter for on-line mode of operation and for battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages.

Using data stored in associated memory, the controller 16 performs one or more instructions that may result in manipulated data, and the controller 16 monitors and controls operation of the UPS 10. The controller 16 may include one or more processors or other types of controllers. In at least one embodiment, the controller 16 is a commercially available, general purpose ARM processor such as a Stellaris ARM Cortex-M3 processor. In other embodiments, the controller 16 includes multiple microprocessors, such as digital signal processors ("DSPs"), ARM processors, and 8051 processors in a variety of combinations. In another embodiment, the controller 16 performs a portion of the functions disclosed herein on a general purpose processor and performs another portion using an application-specific integrated circuit ("ASIC") tailored to perform particular operations. As illustrated by these embodiments, the operations described herein may be performed using many specific combinations of hardware and software and embodiments are not limited to any particular combination of hardware or software components.

The data storage 32 stores computer readable and writable information required for the operation of the UPS 10. This information may include, among other data, data subject to manipulation by the controller 16 and instructions that are executable by the controller 16 to manipulate data. For instance, in one embodiment, the data storage 32 stores instructions that cause the controller 16 to execute a cloud interface, such as the cloud interface 126 described above with reference to FIG. 1. The data storage 32 may be a relatively high performance, volatile, random access memory such as a dynamic random access memory ("DRAM") or static memory ("SRAM") or may be a non-volatile storage medium such as magnetic disk or flash memory. In one embodiment, the data storage 32 includes both volatile and non-volatile storage.

In another embodiment, the data storage 32 includes data structures that store one or more operational parameters. These operational parameters affect the operation of the UPS 10. In some embodiments, the operational parameters are stored along with the other information such as the information described above with reference to the device information data storage 128 shown in FIG. 1.

The external system interface 34 exchanges data with one or more external devices. These external devices may include any device configured to communicate using standards and protocols supported by the UPS 10. Examples of specific standards and protocols that the external system interface 34 may support include parallel, serial, Ethernet, Wi-Fi, Zigbee, BlueTooth, and USB interfaces. Other examples of these supported protocols and standards include networking technologies such as Ethernet, user datagram protocol ("UDP"), transmission control protocol/internet protocol ("TCP/IP"), and HTTP. In at least some examples, the external system interface includes an NMC and an Ethernet interface.

Other embodiments include specialized computing devices, such as ACDs, that are specifically configured to control one or more industrial processes and to communicate with a cloud service, such as the cloud service 104 described above with reference to FIG. 1, via a communication network, such as the communication network 130 described above with reference to FIG. 1. One example of an ACD in accord with the embodiments disclosed herein is the PLC1 that is described in U.S. Pat. No. 6,640,140, entitled PLC EXECUTIVE WITH INTEGRATED WEB SERVER, issued Oct. 28, 2003, which is hereby incorporated by reference herein in its entirety ("the '140 Patent"). Various ACDs described herein may communicate using a variety of industrial protocols including MODBUS, UMAS, BACnet, LON, C-BUS™, TCP/IP over Ethernet, DMX512 and JCI-N2, and wireless protocols, such as ZigBee and Bluetooth. In at least one embodiment ACDs transmit information to a cloud service using web service calls transported over HTTP.

In other embodiments, ACDs provide a user interface through which the ACDs receive information (e.g., configuration information) for storage in a device information data storage, such as the device information data storage 128 described above with reference to FIG. 1. In these embodiments, the device information specifies whether and how the ACDs are to interact with the cloud service. For instance, the user interface may provide device information that specifies no interaction with the cloud service by removing (or not including) a URL for the cloud service. In another instance, the user interface may provide device information that specifies both schedule information and a URL of the cloud service, thereby configuring the ACD to upload information to the cloud service identified by the URL according to the schedule information. Further, in some embodiments, the ACDs serve this user interface as a web site to browsers via a web server resident on the ACDs.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
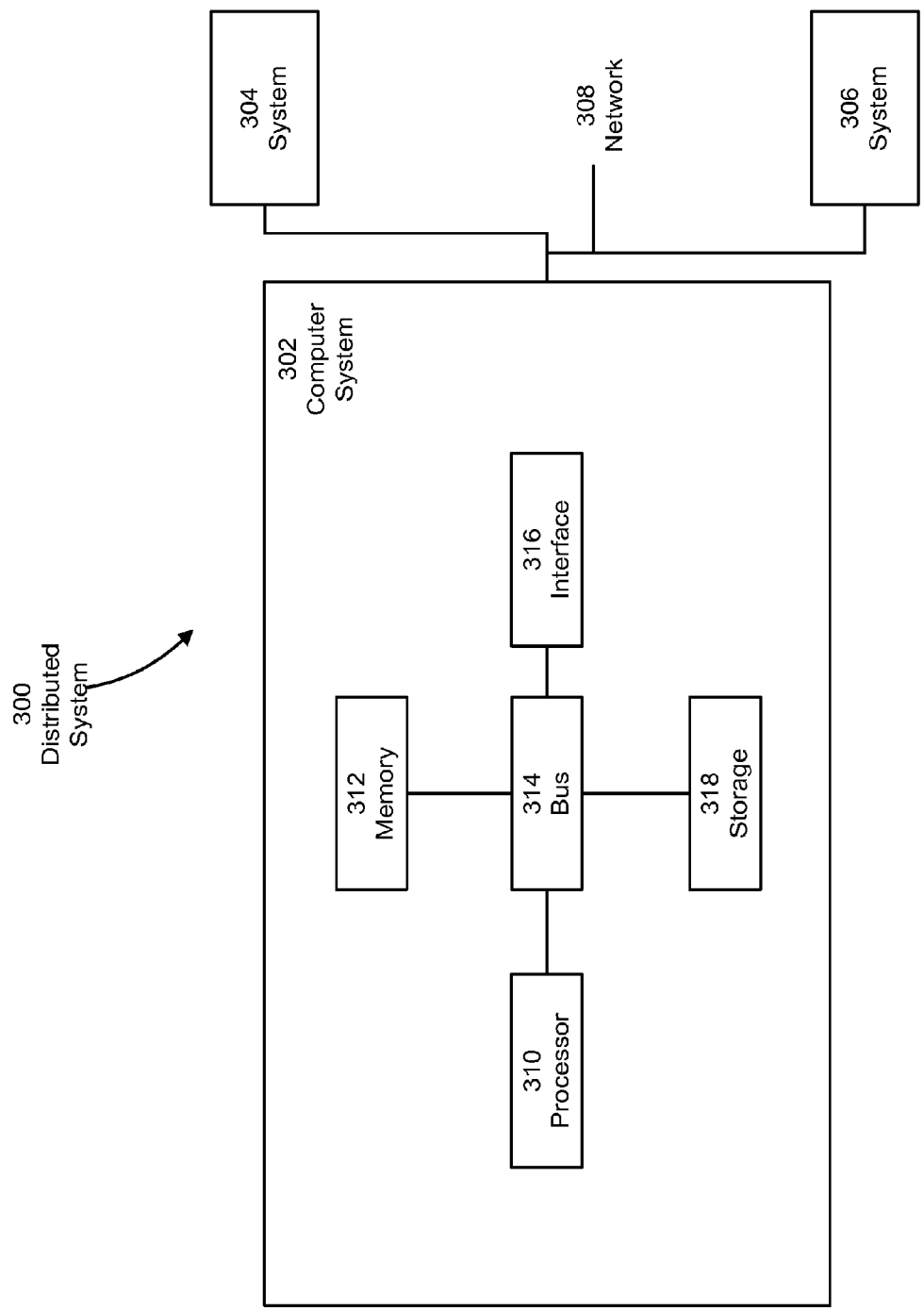
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, HTTPS, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Cloud-Based Computing System Processes

Figure 4:
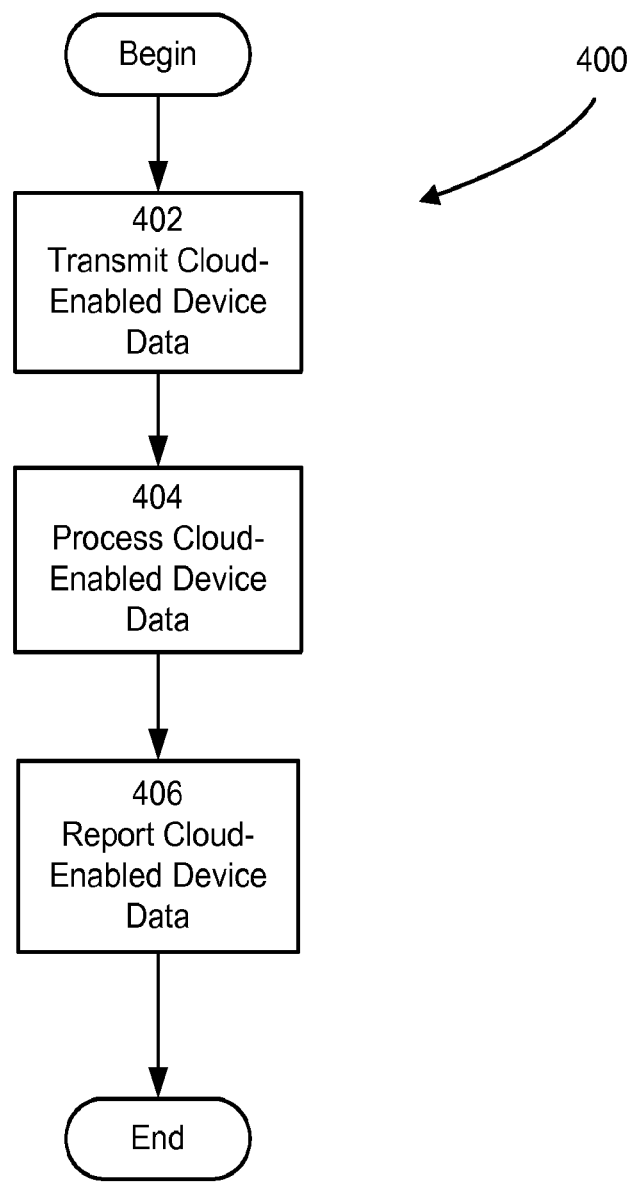
FIG. 4 is a flow diagram illustrating a process of providing information regarding cloud-enabled devices.

As described above with reference to FIG. 1, various embodiments perform processes that enable centralized monitoring, configuration, and control of cloud-enabled devices via a cloud service. According to some embodiments, the cloud-enabled devices are disposed at separate, discrete geographic locations. In other embodiments, the monitoring process is executed by a cloud-based computing system, such as the cloud-based computing system 100 described above with reference to FIG. 1. One example of such a monitoring process is illustrated in FIG. 4. According to this example, a process 400 includes acts of transmitting cloud-enabled device information, processing the transmitted cloud-enabled device information, and reporting the received cloud-enabled device information.

In act 402, a plurality of cloud-enabled devices resident at different sites transmit information to a cloud service. Acts performed by some embodiments as part of the act 402 are described further below with reference to FIG. 6. Next, in act 404, the cloud service processes the information. The processing performed in act 404 varies between embodiments and may include verifying that the information is authentic and calculating metrics using the information or otherwise summarizing the information. Acts performed by some embodiments as part of the act 404 are described further below with reference to FIG. 7. In act 406, the cloud service reports the information and other information derived from the information, and the process 400 ends. The information reported within the act 406 may include historical trends, statistical summaries of the reported information, and aggregated information from multiple cloud-enabled devices spanning several sites. In addition, the information reported may include HTML or other information that is used by a browser to render the information provided by the cloud service. An exemplary user interface screen provided by at least one embodiment as part of the act 406 is illustrated below with reference to FIG. 11.

Figure 5:
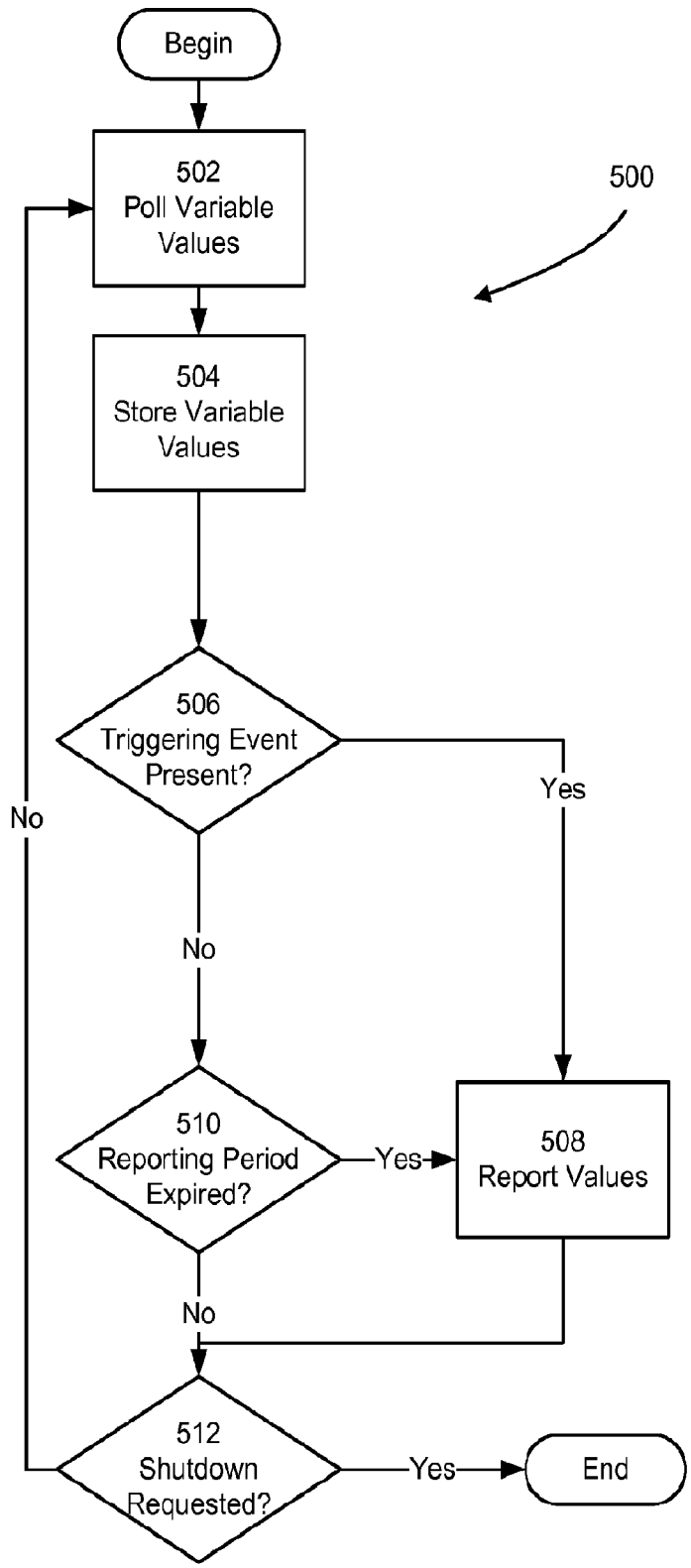
FIG. 5 is a flow diagram illustrating a process of self-monitoring and reporting executed by a cloud-enabled automatic control device ("ACD")

Some embodiments perform processes that enable a cloud-enabled device to monitor itself and the equipment it manages or supports and to report information regarding either to a centralized data store, such as the collective device information data storage 120. In some embodiments, these monitoring processes are performed by a cloud-enabled device, such as a cloud-enable UPS or cloud-enabled ACD as described above, via execution of a cloud interface, such as the cloud interface 126 described above with reference to FIG. 1. One example of such a self-monitoring process is illustrated in FIG. 5. According to this example, a process 500 includes acts of polling variable values, storing the variable values, determining whether the variable values indicate that an event of importance has occurred, determining whether a period of time since the stored variable values were last reported has expired, reporting variable values, and determining whether shutdown of the cloud-enabled device executing the process 500 is imminent.

In act 502, the cloud interface begins the process 500 by polling the memory of the cloud-enabled device for the current value of one or more variables descriptive of the cloud-enabled device or the functions that the cloud-enabled device performs. In the case of a cloud-enabled ACD, the values of these variables represent a variety of physical measurements and other information that are used as inputs to the process control logic executed by the cloud-enabled ACD or that are provided as outputs resulting from the execution of the process control logic. Examples of the physical phenomenon represented by variables include temperature, light levels, power levels, weight, and humidity. In the case of a cloud-enabled UPS, the values of these variables represent efficiency information, information identifying the current source of the power supplied to one or more loads, power quality information, and information indicative of remaining battery charge, capacity, or life.

In act 504, the cloud interface stores the values of the polled variables in a data buffer. In act 506, the cloud interface analyzes the stored information to determine whether any of the stored information indicates that an event of importance has occurred. If so, the cloud interface reports the stored variable values to the cloud service and, where the stored variable values have been successfully reported to the cloud service, clears the data buffer in act 508. In at least one embodiment, during execution of the act 508, the cloud interface reports the stored variable values by executing a process in accord with the process 600 described further below with reference to FIG. 6. Otherwise, the cloud interface determines whether a communication interval or reporting time interval has transpired in act 510. If so, the cloud interface reports the stored variable values to the cloud service and clears the data buffer in act 508. In some embodiments, particular variables for which values are reported in act 508 are specified in configuration information, such as the configuration information discussed above with reference to FIG. 1. This configuration information may specify multiple subsets of variables that are each reported according to a different schedule.

If the cloud interface determines that neither a communication interval nor a reporting interval has transpired, the cloud interface next determines whether a shutdown of the cloud-enabled device is imminent in act 512. If so, the cloud interface terminates the process 500. Otherwise, the cloud interface executes the act 502.

Figure 6:
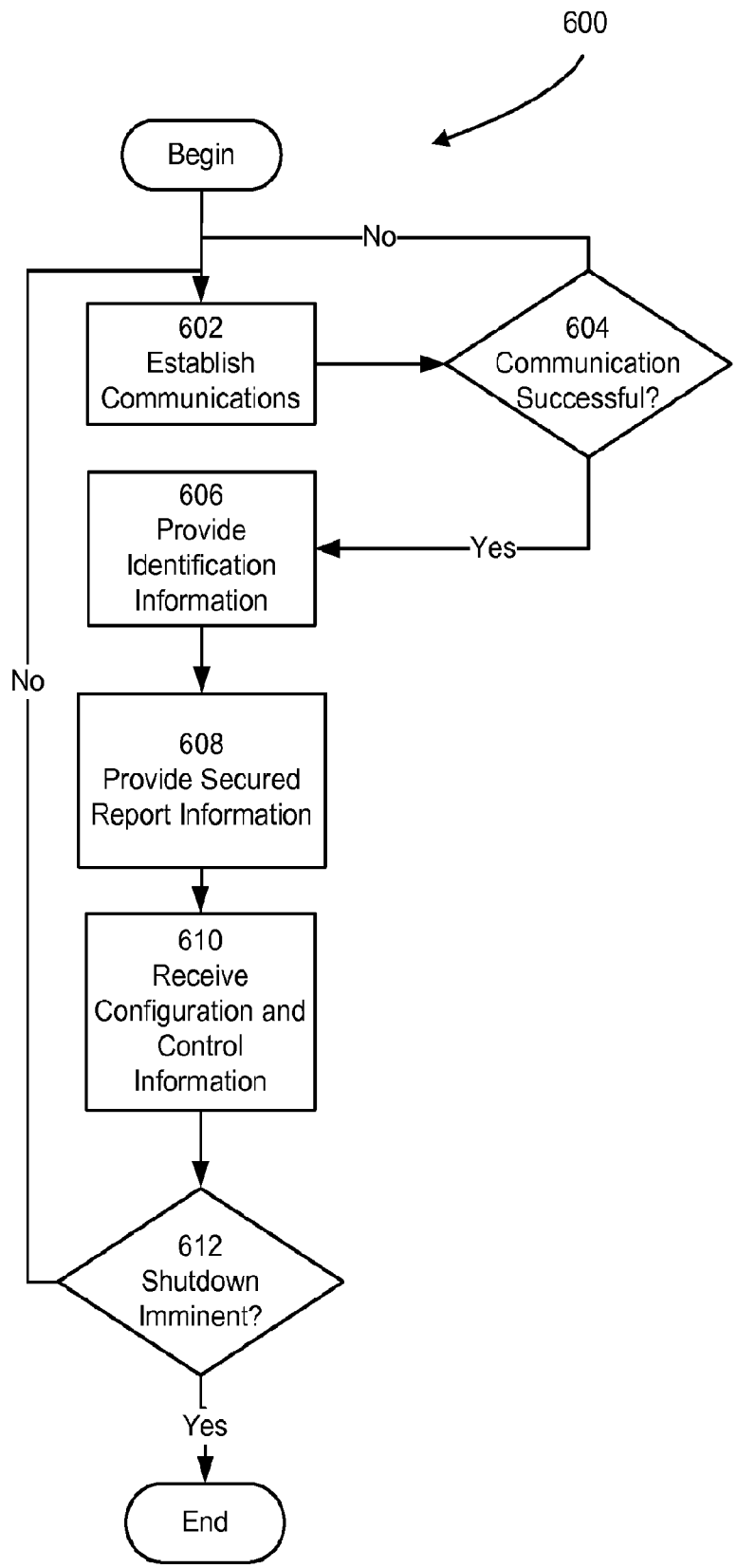
FIG. 6 is a flow diagram illustrating a process for communicating with a cloud service.

As described above with reference to FIGS. 1 and 5, various embodiments perform processes that initiate communications between a cloud-enabled device, such as the cloud-enabled device 106, and a cloud service, such as the cloud service 104. One example of such a process is illustrated in FIG. 6. According to this example, the process 600 includes acts of attempting communications, determining whether communications have been successfully established, providing identification information, providing secured report information, receiving configuration and control information, and determining whether a shutdown of the cloud-enabled device is imminent.

In act 602, the cloud-enabled device attempts to establish communications with the cloud service via a cloud interface, such as the cloud interface 126 described above with reference to FIG. 1. In various embodiments, the cloud interface attempts to establish communications with the cloud service according to schedule information stored in a device information data storage, such as the device information data storage 128 described above with reference to FIG. 1. In some embodiments, upon receiving an indication of an initial, post-factory coupling of the cloud-enabled device to a network, such as the network 130 described above with reference to FIG. 1, the cloud interface attempts to establish communications with the cloud service. In this situation, the cloud interface attempts to establish communications using configuration information stored in the device information data storage during manufacturing of the cloud-enabled device. For example, according to one embodiment the cloud interface will transmit an HTTP message (e.g., an HTTP POST) to a URL specified within configuration information stored within the device information data storage during the manufacturing process of the cloud-enabled device.

In act 604, if communications are successfully established, (e.g., the cloud interface receives a responsive HTTP message prior to expiration of a configurable timeout parameter) the cloud interface executes act 606. Otherwise, the cloud interface repeats its attempts to establish communications with the cloud service according to the schedule information specified in the configuration information. In some embodiments, a record of each communication attempt is stored within the device information data storage and after a threshold number of communication attempts fail, the cloud interface attempts to establish communications with a back-up identifier of a cloud service. In at least one embodiment, this back-up identifier is permanent (i.e., not configurable via the cloud service).

In act 606, the cloud-enabled device provides identification information to the cloud service via the cloud interface. The identification information provided may be information unique to the cloud-enabled device, such as some combinations of the identification information described above with reference to the device information data storage 128. In some embodiments, the cloud interface encrypts the identification information using a security key included in the configuration information prior to transmitting it to the cloud service. In some embodiments, this security key is a public key corresponding to a private key stored locally on the cloud service. The security key may be a common key used by one or more cloud-enabled devices. In other embodiments, the cloud interface does not encrypt the identification information prior to transmitting it to the cloud service.

In act 608, the cloud-enabled device provides secured report information to the cloud service via the cloud interface. The report information provided may be any information descriptive of the operating performance of the cloud-enabled device, information descriptive of the environment of the cloud-enabled device, control information stored in the cloud-enabled device or any other information described above with reference to the device information data storage 128. In some embodiments, to secure the report information the cloud interface encrypts the report information using a security key included in the configuration information prior to transmitting it to the cloud service. In some embodiments, this security key is a public key corresponding to a private key stored locally on the cloud service. In other embodiments, the security key is a secret key stored on the cloud-enabled device during its manufacturing process. In these embodiments, the security key may be updated by a unique key generated by the cloud service. This unique key may be provided within a secured payload to the cloud-enabled device for its exclusive use as part of act 610 below. Embodiments that utilize unique security keys are described further below with reference to FIG. 7. Although the acts 604, 606, and 608 are depicted as separate acts, in some embodiments, acts 604, 606 and 608 are executed as a single act (e.g., a single HTTP POST), such that both identification information and secured information are provided as part of a single data transmission.

In act 610, the cloud-enabled device receives configuration and control information from the cloud service via the cloud interface. In some embodiments, the configuration and control information is received in the body of a response to an HTTP POST. The configuration and control information received may be any configuration or control information used by the cloud-enabled device. For example, the configuration information may include an identifier of a cloud service, authentication information for authenticating communications to the cloud service, and schedule information as described above with reference to the device information data storage 128 of FIG. 1. The control information may include one or more commands to be executed by the cloud-enabled device, such as a shutdown command or a self-test command. In general, the cloud interface may receive configuration and control information as part of any communication activity between the cloud-enabled device and the cloud service. However, in some embodiments, as part of initial, post-factory communications between the cloud-enabled device and the cloud service, the cloud interface receives the unique key described above in the act 608. As is described further below, in at least one embodiment, the unique key is randomly generated by the cloud service upon initial communications between the cloud-enabled device and the cloud service. In other embodiments, the cloud interface further receives a new cloud service identifier or new schedule information during initial, post-factory communications between the cloud-enabled device and the cloud service. After receiving new configuration and control information, the cloud interface stores the configuration and control information locally in the device information data storage. Next, as part of the act 610, the cloud-enabled device configures itself to utilize the new configuration information and executes any commands included in the to control information.

In act 612, the cloud-enabled device determines whether a shutdown of the cloud-enabled device is imminent. If so, the cloud-enabled device terminates the process 600. Otherwise, the cloud-enabled device executes the act 602.

Processes such as the process 600 provide several advantages over convention cloud-enabled device communication processes. For instance, by receiving configuration information through the cloud interface rather than a local user interface, the process 600 enables the cloud-enabled device to include minimal user interface hardware and software, thereby decreasing the cost of the cloud-enabled device.

Figure 7:
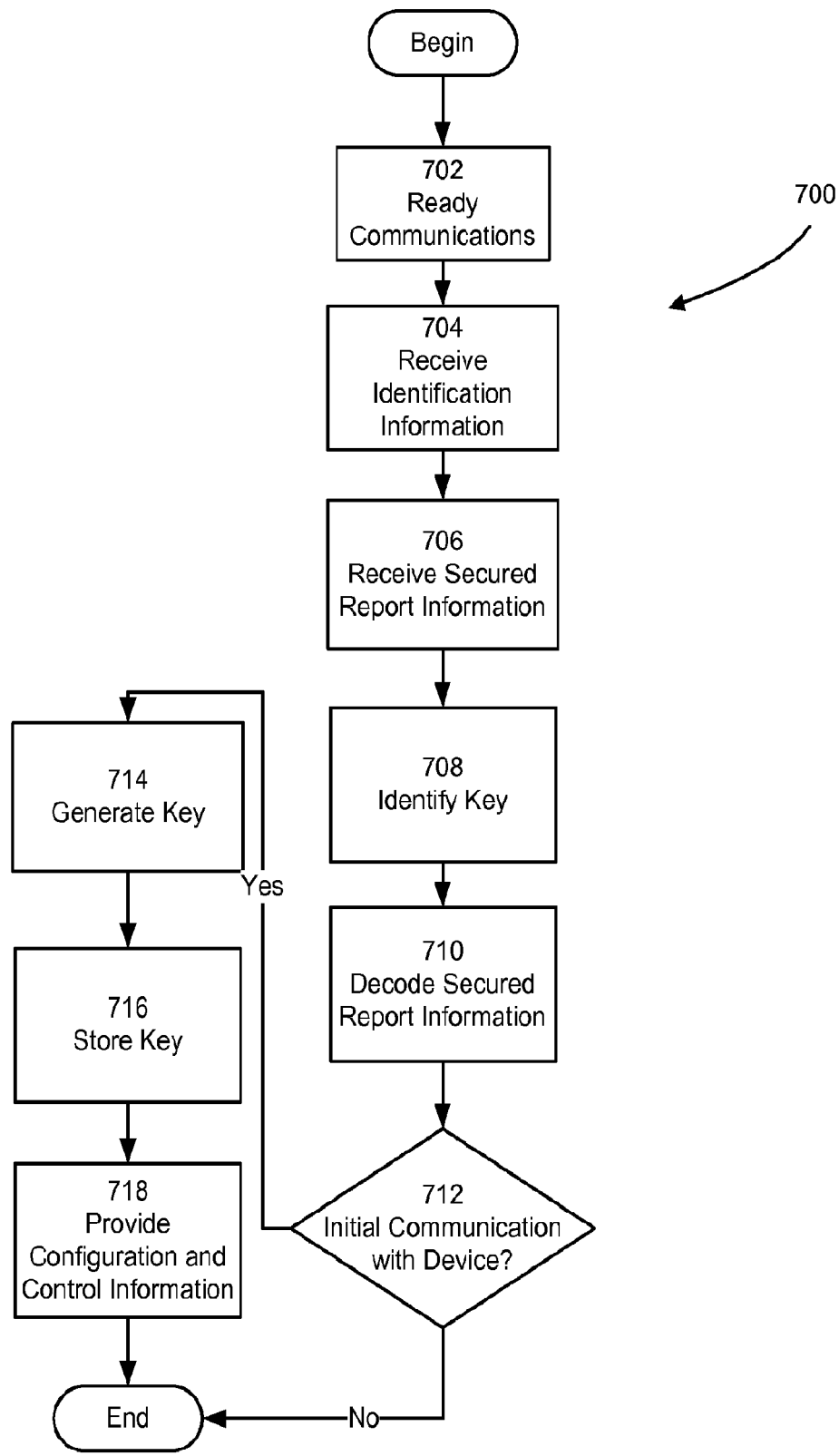
FIG. 7 is a flow diagram illustrating a process for communicating with a cloud-enabled device.

As described above with reference to FIGS. 1, 4 and 6, various embodiments perform processes in which a cloud service, such as the cloud service 104, receives and stores information from one or more cloud-enabled devices, such as the cloud-enabled device 106. One example of such a process is illustrated in FIG. 7. According to this example, a process 700 includes acts of establishing communications, receiving identification information, receiving secured report information, identifying a key, decoding the secured information, determining whether the cloud service has previously communicated with the cloud-enabled device, generating a unique security key, storing the unique security key, and providing configuration and control information.

In act 702, the cloud service readies itself for communications with the cloud-enabled device by executing a device interface, such as the device interface 108 described above with reference to FIG. 1. In various embodiments, the device interface establishes communications with the cloud-enabled device by responding to an HTTP message transmitted by the cloud-enabled device via a network, such as the network 130 described above with reference to FIG. 1. In some embodiments, as part of the act 702, the cloud service reserves a predetermined amount of communication resources for cloud-enabled devices that subscribe to enhanced levels of service. In these embodiments, the cloud service may employ shorter timeouts and be less responsive to cloud-enabled devices that do not subscribe to one of the enhanced levels of service.

In act 704, the cloud service receives identification information from the cloud-enabled device via the device interface. The identification information provided may be information unique to the cloud-enabled device, such as some combinations of the identification information described above with reference to the device information data storage 128. In some embodiments, the device interface decrypts the identification information using a security key included in a collective device information data storage, such as the collective device information data storage 120 described above with reference to FIG. 1. In some embodiments, this security key is a private key corresponding to a public key stored locally on the cloud-enabled device. In other embodiments, the device interface does not decrypt the identification information.

In act 706, the cloud service receives secured report information from the cloud-enabled device via the device interface. The report information provided may be any information descriptive of the operating performance of the cloud-enabled device, information descriptive of the environment of the cloud-enabled device, control information stored in the cloud-enabled device or any other information described above with reference to the device information data storage 128. While the acts 704 and 706 are illustrated as separate acts in FIG. 7, in some embodiments, the acts 704 and 706 may be performed by a single data transmission, such as a single HTTP POST.

In act 708, the cloud service identifies the security key associated with the cloud-enabled device. In some embodiments, the cloud application identifies the security key by referencing the associations between security keys and cloud-enabled device stored in the collective device information data storage. In act 710, the cloud service executes a predetermined number of attempts to decode the report information. In some embodiments, the cloud application attempts to decode the report information by using the security key identified in the act 708 to decrypt the report information. If the cloud application successfully decodes the report information as a result of any of these attempts, the cloud application stores (e.g., in the collective device information data storage) the decoded report information and associations between the decoded report information and the identification information, and then executes act 712. Otherwise, the cloud application executes a predetermined number of attempts to decode the report information using a previous security key, such as the original security key generated during manufacturing of the cloud-enabled device. If the cloud application successfully decodes the report information as a result of any of these attempts, the cloud application stores (e.g., in the collective device information data storage) the decoded report information and associations between the decoded report information and the identification information. Next, the cloud application executes the act 712.

In the act 712, the cloud service determines whether the cloud-enabled device identified by the identification information received in the act 704 has been in prior communication with the cloud service. In some embodiments, the device interface makes this determination by scanning the device information data storage for information indicating previous communications with the cloud-enabled device. If previous communications between the cloud service and the cloud-enabled device have not occurred, the cloud service executes act 714. Otherwise, the cloud service terminates the process 700.

In act 714, the cloud service generates a security key unique to the cloud-enabled device. In some embodiments, a cloud application, such as the cloud application 124 described above with reference to FIG. 1, generates the security key is based on a set of information that includes a random data. In act 716, the cloud application stores, within the collective device information data storage, the generated security key and an association between the generated security key and the cloud-enabled device.

In act 718, the cloud service provides configuration and control information to the cloud-enabled device via the device interface. The configuration and control information provided may be any configuration information used by the cloud-enabled device. For example, the configuration information may include an identifier of a cloud service, authentication information for gaining access to the cloud service, and schedule information as described above with reference to the device information data storage 128 of FIG. 1. In addition, the configuration information may include the generated security key. The control information may include one or more commands to be executed by the cloud-enabled device, such as a shutdown command, a self-test command, a command to toggle power at an outlet, a command to sound a beeper, a command to dim or turn-off lights according to a holiday or occupancy schedule, a command to decrease power provided to a load, a command to alter or cease an industrial process according to a holiday or occupancy schedule, etc.

As described above with reference to FIG. 6, in some embodiments, after receiving new configuration and control information, the cloud-enabled device adjusts its configuration information to match the new configuration information and executes any commands included in the control information. Thus in these embodiments, after receiving the generated security key, the cloud-enabled device encrypts report information using the generated security key. After performing the act 718, the cloud service terminates the process 700.

Processes such as the process 700 provide several advantages over convention cloud-enabled device communication processes. For instance, by utilizing randomly generated security keys, the process 700 relegates the risk of the secured report information being comprised to the initial communication between the cloud-enabled device and the cloud service. Further, the process 700 prevents users from entering, reviewing or even being aware of the security key, thereby increasing the security of the communication process.

Figure 8:
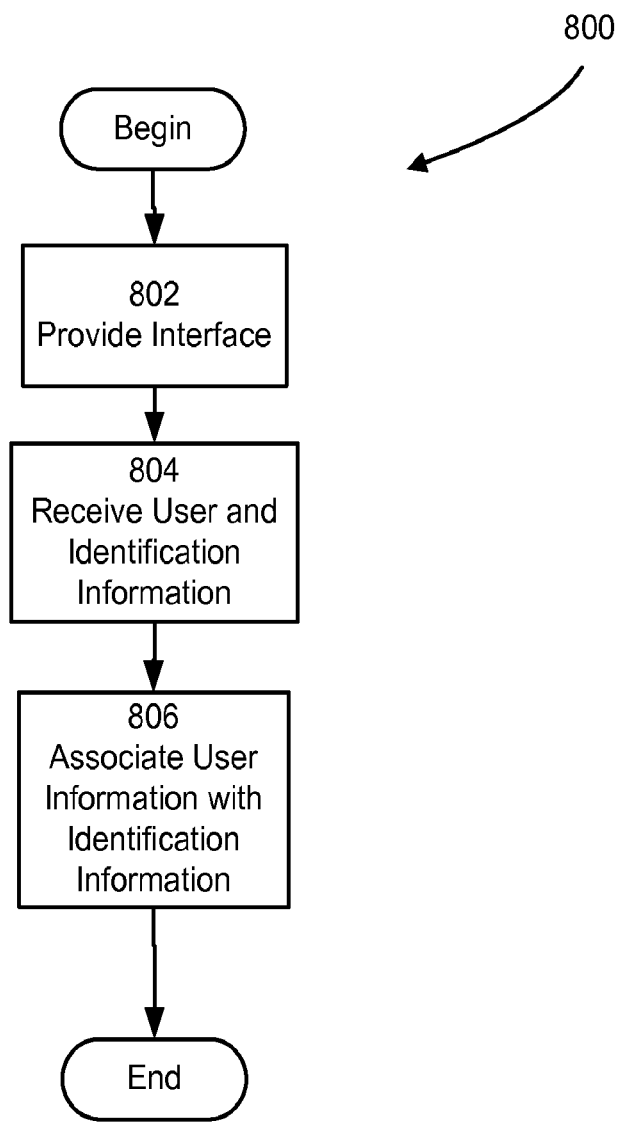
FIG. 8 is a flow diagram illustrating a process for associating cloud-enabled devices with user information.

Other embodiments perform processes in which a cloud service, such as the cloud service 104, associates one or more cloud-enabled devices, such as the cloud-enabled device 106, with a user, such as the user 102. One example of such a process is illustrated in FIG. 8. According to this example, a process 800 includes acts of providing an interface, receiving user information, and associating the user information with information identifying the cloud enabled device.

In act 802, the cloud service provides an interface to an external entity, such as the user or the computer system 132. In some embodiments, the cloud service provides the interface by executing a cloud application, such as the cloud application 124. In these embodiments, the cloud application provides a user interface to the user via a network, such as the network 130, and the computer system. In at least one embodiment, the user interface is served to the computer system and rendered to the user by a browser executing on the computer system.

In act 804, the cloud service receives user and identification information from the computer system via the cloud application. The user information provided may be information descriptive of the user. For example, the user information may include name, account number, employer, logon credentials, and contact information as described above with reference to the user information data storage 122 of FIG. 1. The identification information received may be any information that identifies one or more cloud-enabled devices, such as serial numbers or MAC addresses as described above with reference to the device information data storage 128 of FIG. 1.

In act 806, the cloud service associates the user with one or more cloud-enabled devices. In some embodiments, the cloud application stores associations between user information that describes the user and identification information that identifies the one or more cloud-enabled devices (e.g., the identification information provided in the act 804). In other embodiments, the cloud application executes a process that attempts to verify that the user owns the cloud-enabled devices prior to storing these associations. One example of such a process is described further below with reference to FIG. 10. Next, the cloud service terminates the process 800.

Processes such as the process 800 provide several advantages over convention cloud-enabled device communication processes. For instance, by associating users with cloud-enabled devices via the cloud application, the process 800 does not require user information be stored in, or transmitted by, the cloud-enabled device; thereby decreasing the system resources required by, and the cost of, the cloud-enabled device while increasing the security of the user information.

Figure 9:
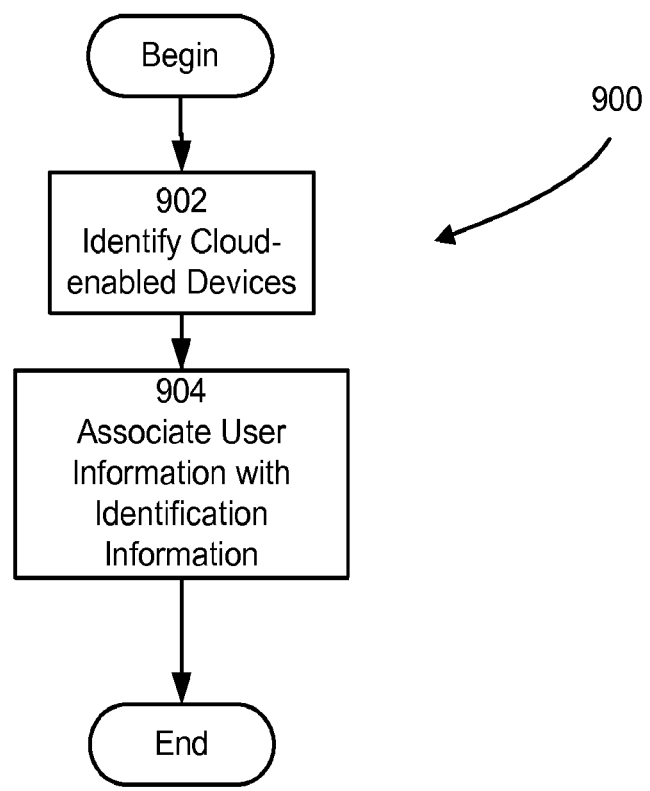
FIG. 9 is a flow diagram illustrating another process for associating cloud-enabled devices with user information.

Other embodiments perform processes in which a cloud service, such as the cloud service 104, assists users, such as the user 102, in identifying one or more cloud-enabled devices, such as the cloud-enabled device 106, owned by the users. One example of such a process is illustrated in FIG. 9. According to this embodiment, a process 900 includes acts of identifying cloud-enabled devices and associating user information with identification information.

In act 902, the cloud service provides an interface to an external entity, such as the user or computer system 132. In some embodiments, the cloud service provides the interface by executing a cloud application, such as the cloud application 124. In these embodiments, the cloud application provides a user interface to the user via a network, such as the network 130, and the computer system. In at least one embodiment, the user interface is served to the computer system and rendered to the user by a browser executing on the computer system. In other embodiments, the cloud application compares the IP address of the computer system to the IP addresses of one or more cloud-enabled devices. Where the IP address of the computer system matches the IP address of one or more cloud-enabled devices (such as where the computer system and the cloud-enabled devices are all serviced by a network forwarding device that utilizes network address translation), the cloud application presents identification information of the cloud-enabled devices with IP addresses matching that of the computer system to the user via the user interface. In at least one embodiment, the user interface includes elements that enable the user to select, from the presented identification information, identification information that identifies cloud-enabled devices owned by the user. In this embodiment, the user interface provides selected identification information to the cloud application.

In act 904, the cloud service associates the user with the one or more cloud-enabled devices. In some embodiments, the cloud application stores associations between user information describing the user and the selected identification information. Next, the cloud service terminates the process 900.

Processes such as the process 900 provide several advantages over convention cloud-enabled device association processes. For instance, by providing users with identification information for one or more cloud-enabled devices that share the IP address of the user's computer, the process 900 decreases the difficult of identifying cloud-enabled device owned by the user.

Figure 10:
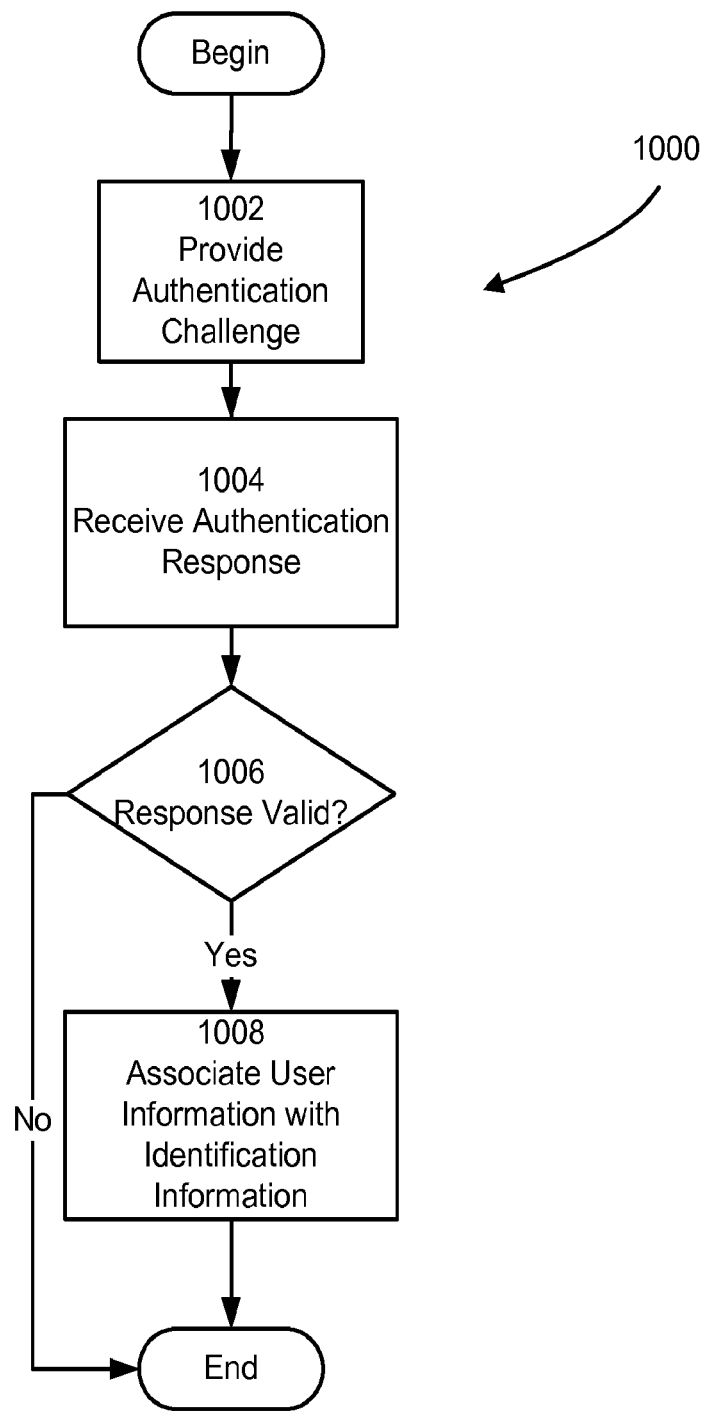
FIG. 10 is a flow diagram illustrating another process for associating cloud-enabled devices with user information.

Other embodiments perform processes in which a cloud service, such as the cloud service 104, verifies that that a user, such as the user 102, is in possession of a cloud-enabled device, such as the cloud enabled device 106, with which the user is attempting to associate himself. One example of such a process is illustrated in FIG. 10. According to this example, a process 1000 includes acts of providing an authentication challenge, receiving an authentication response, determining whether the response is valid, and associating user information with identification information for a cloud-enabled device.

In act 1002, the cloud service provides an interface to an external entity, such as the user or computer system 132. In some embodiments, the cloud service provides the interface by executing a cloud application, such as the cloud application 124. In these embodiments, the cloud application provides a user interface to the user via a network, such as the network 130, and the computer system. In at least one embodiment, the user interface is served to the computer system and rendered to the user by a browser executing on the computer system. In other embodiments, the cloud application provides an authentication challenge to the user via the user interface. The authentication challenge may request information be supplied, or actions be conducted, that require possession of the cloud-enabled device. Examples of authentication challenges include: requesting that the user manipulate an actionable element (e.g., button, switch, etc.) of the cloud-enabled device; requesting that the user disconnect the cloud-enabled device from a network, such as the network 130; requesting that the user cause a power or load fluctuation (e.g., requesting that the user disconnect input power to the cloud-enabled device); and sending a code to a local display on the cloud enabled device and requesting that the user enter the code into the user interface.

In act 1004, the cloud service receives a response to the authentication challenge. In some embodiments, the cloud application receives the response via either a device interface, such as the device interface 108, or the user interface, depending upon the authentication challenge provided in the act 1002.

In act 1006, the cloud service determines whether the authentication response is valid. In some embodiments, the cloud application makes this determination by comparing the response to information describing the authentication challenge. If the response is deemed valid, the cloud application executes act 1008. Otherwise, the cloud application terminates the process 1000.

In act 1008, the cloud service associates the user with the cloud-enabled device. In some embodiments, the cloud application stores associations between user information describing the user and the identification information identifying the cloud-enabled device. Next, the cloud service terminates the process 1000.

Processes such as the process 1000 provide several advantages over convention cloud-enabled device association processes. For instance, by requiring users have knowledge or perform actions that require possession of cloud-enabled devices they are attempting to associate with themselves, the process 1000 decreases the likelihood that an individual will be able to associate himself with a cloud-enabled device owned by another.

Processes 400 through 1000 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

User Interface Screens

Figure 11:
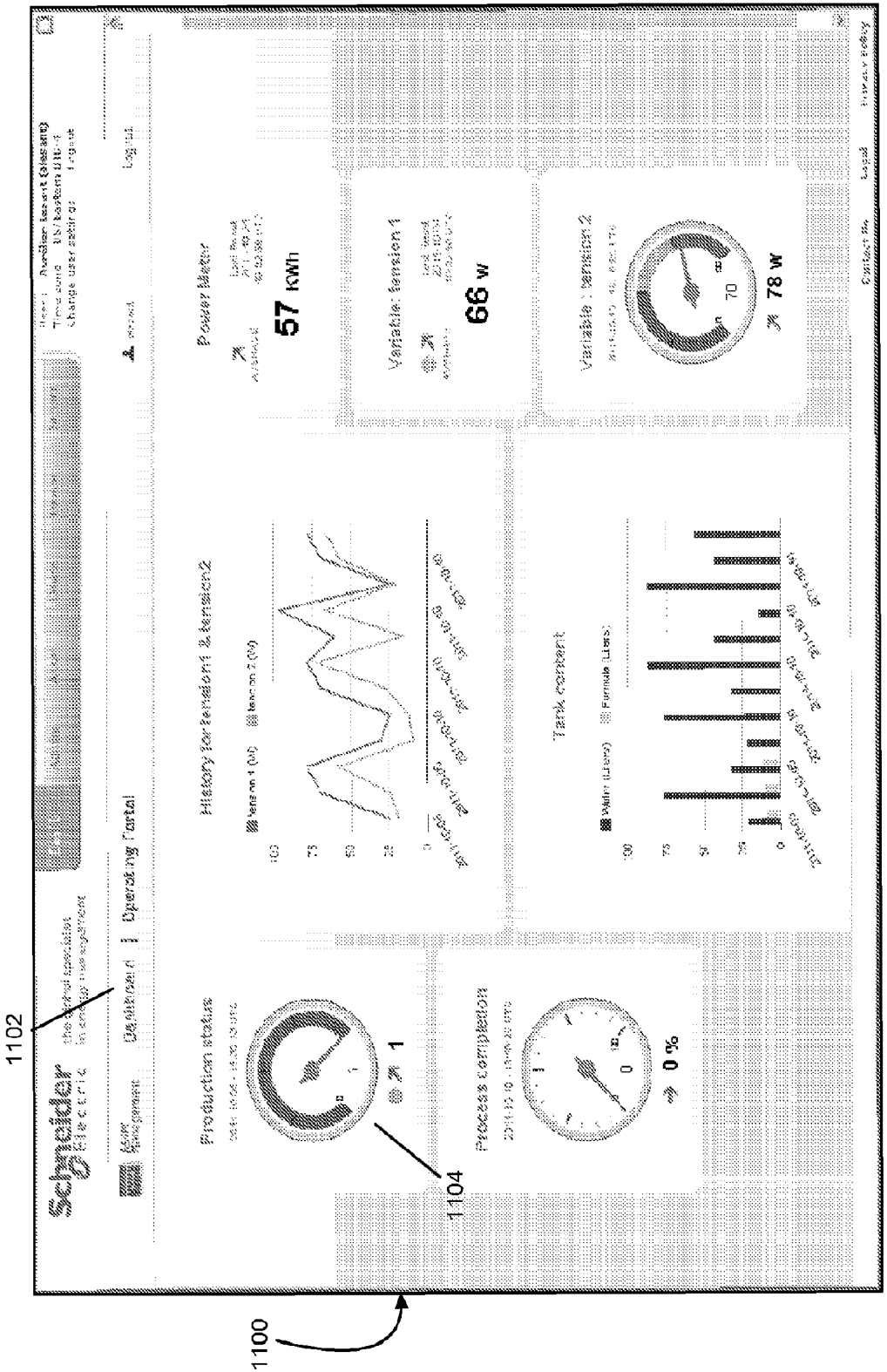
FIG. 11 is an exemplary user interface screen configured to provide information regarding cloud-enabled devices.

As describe above with reference to FIG. 4, some embodiments disclosed herein render, on one or more computer systems, dashboard user interface screens including information provided by cloud-enable devices. FIG. 11 illustrates an exemplary dashboard 1100 according to one such embodiment. As shown in FIG. 11, the dashboard 1100 includes a menu 1102, and a variety of widgets 1104. Each of the widgets 1104 provides a visual representation of one or more variable values included in information that was pushed to the cloud service from one or more cloud-enabled devices. As shown in FIG. 11, the widgets provide a variety of information including production status information, process completion information, historical and current tension information, tank content information, and power meter information. Also as shown in FIG. 11, these elements of information are displayed using a variety of user interface elements, such as graphs, dials, and trend arrows.

Exemplary Cloud-Based System

Figure 12:
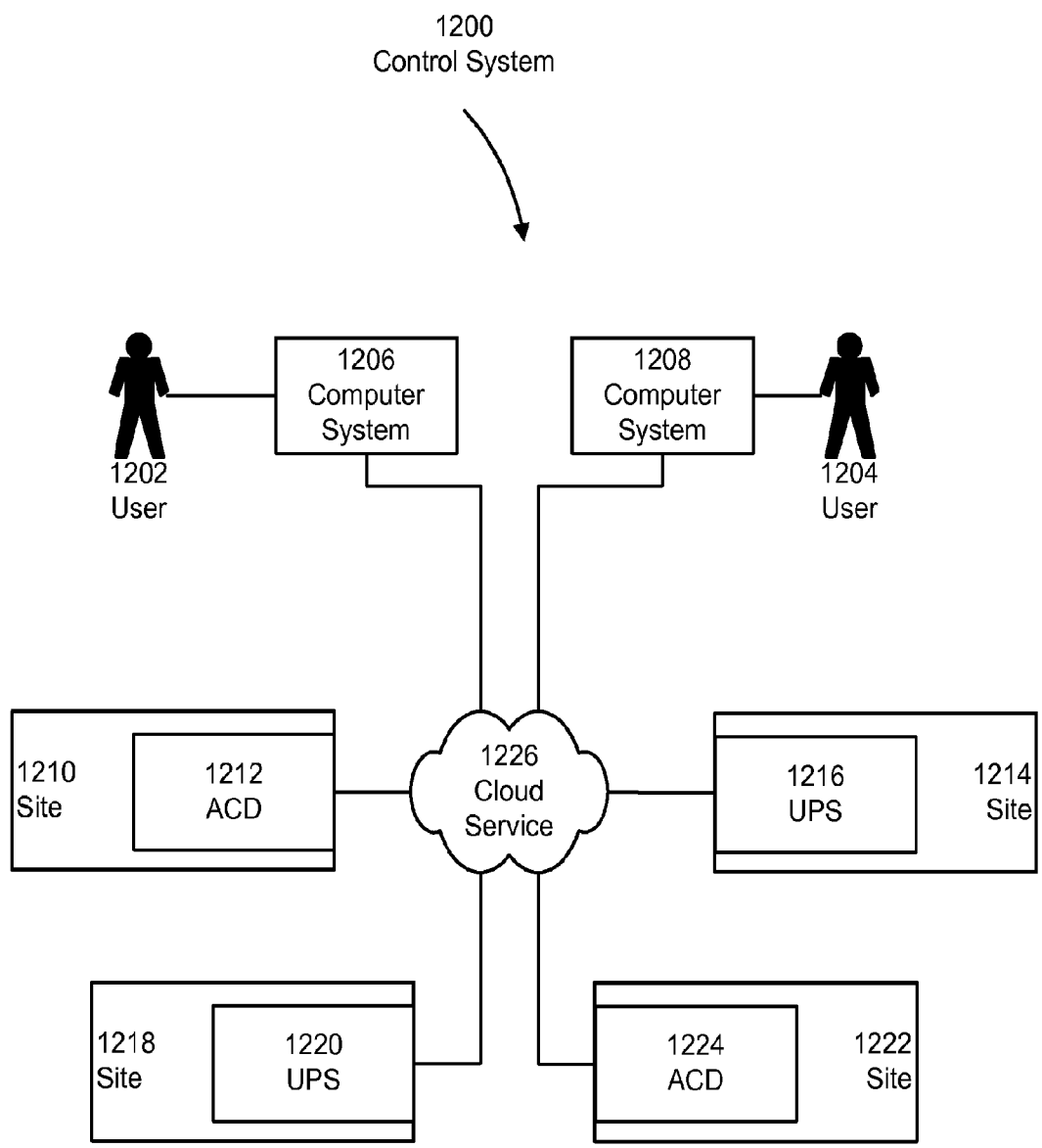
FIG. 12 is a schematic context diagram including an exemplary cloud-based system.

FIG. 12 illustrates an exemplary control system 1200 that provides centralized device and process monitoring using one or more computer systems and one or more cloud-enabled devices. The configuration illustrated in FIG. 12 may be implemented using the components disclosed herein with reference to FIGS. 1-3 and the '140 Patent. As shown in FIG. 12, the control system 1200 includes computer systems 1206 and 1208, ACDs 1212 and 1224, UPSs 1216 and 1220, and a cloud service 1226. In this embodiment, each of the ACDs 1212 and 1224 and the UPSs 1216 and 1220 is a cloud-enabled device, such as the cloud enabled device 106 described above with reference to FIG. 1. In this example, the computer systems 1206 and 1208 are respectively used by users 1202 and 1204 and the cloud-enabled devices 1212, 1216, 1220, and 1224 are located at geographically separate and discrete physical locations, sites 1210, 1214, 1218, and 1222. Although the example illustrated in FIG. 12 includes one cloud-enabled device per site, examples are not limited to such a configuration. For instance, other examples include a multiple cloud-enabled devices per site.

As shown in FIG. 12, the computer systems 1206 and 1208 exchange (i.e. send or receive) information regarding the cloud-enabled devices 1212, 1216, 1220, and 1224 with the cloud service 1226 via a communication network. This information may include information descriptive of the cloud-enabled device or its functions, which are described above, and may include other information such as data summarized from the cloud-enabled device information or information used to render a user interface that presents this information or summary information within a browser. One particular example of a dashboard user interface resulting from the information exchanged between the computer systems 1206 and 1208 and the cloud service 1226 is described above with reference to FIG. 11. The communication network facilitating the data communication between the computer systems 1206 and 1208 and the cloud-enabled devices 1212, 1216, 1220, and 1224 may include any network through which computer systems may exchange information. In the embodiment illustrated in FIG. 12, the cloud-enabled devices 1212, 1216, 1220, and 1224 transmit information to the cloud service 1226 using web service calls transported over HTTP.

In another example illustrated by FIG. 12, the user 1204 interacts with the cloud service 1226 to actively manage the batteries used by the UPSs 1216 and 1220. More particularly, in this example, the user 1204 configures a cloud application, such as the cloud application 124 describe above with reference to FIG. 1, to periodically request that the UPSs 1216 and 1220 conduct tests of the batteries and report test results to the cloud application. In some examples, the user 1204 reviews the test results via the cloud application. In other examples, the cloud application analyzes the test results and alerts the user 1204 to anomalous battery performance characteristics. In either example, the user 1204 may notify the customer who owns the UPSs of potential battery performance issues prior to battery failure.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
    at least one power device including:
        an input to receive power from a power source;
        an output operatively coupled to the input and configured to provide power;
        a data storage;
        a network interface; and
        a controller coupled to the input, the output, the data storage and the network interface and configured to:
            provide, according to a reporting schedule, identification information directly to a cloud service via the network interface;
            provide, according to the reporting schedule, secured information directly to the cloud service, the secured information being descriptive of performance of the at least one power device;
detect occurrence of an event of importance;
assign, responsive to detecting that the event of importance has occurred, a value to the event of importance corresponding to a level of importance;
compare the value to a threshold; and
transmit, responsive to detecting that the event of importance has occurred and comparing the value to the threshold, event information directly to the cloud service, the event information being descriptive of the event of importance.

2. The system according to claim 1, further comprising a user interface mounted on the at least one power device and consisting of a switch configured to control communications between the at least one power device and the cloud service.

3. The system according claim 1, wherein the controller is further configured to establish communication with the cloud service responsive to detection that a value of report information is in a predetermined relationship with a threshold value.

4. The system according to claim 1, wherein the controller is further configured to establish communication with the cloud service according to a communication schedule.

5. The system according to claim 4, wherein the communication schedule specifies a continuously repeating time interval.

6. The system according to claim 1, further comprising the cloud service, the cloud service including at least one computer system configured to:
receive identification information from the at least one power device;
receive the secured information from the at least one power device;
identify a key using the identification information; and
decode the secured information using the key.

7. The system according to claim 6, wherein the at least one computer system is further configured to:
provide a user interface;
receive user information via the user interface; and
associate the user information with historical information associated with the identification information and previously received in a separate communication from the at least one power device.

8. The system according to claim 6, wherein the system further comprises a network address translation device, wherein the at least one power device includes a plurality of power devices being serviced by the network translation device, and the at least one computer system is configured to:
identify the plurality of power devices as having a same internet protocol address; and
associate, responsive to identifying the plurality of power devices as having the same internet protocol address, the user information with identification information for each of the plurality of power devices.

9. The system according to claim 6, wherein the at least one computer system is further configured to:
provide an authentication challenge via the user interface; and
receive an authentication response.

10. A method of transmitting data from a power device to a cloud service, the method comprising:
providing, by the power device according to a reporting schedule, identification information directly to a cloud service via the network interface;
providing, by the power device according to the reporting schedule, secured information directly to the cloud service, the secured information being descriptive of performance of the at least one power device;
detecting occurrence of an event of importance;
assigning, responsive to detecting that the event of importance has occurred, a value to the event of importance corresponding to a level of importance;
comparing the value to a threshold; and
transmitting, responsive to detecting that the event of importance has occurred and comparing the value to the threshold, event information directly to the cloud service, the event information being descriptive of the event of importance.

11. The method according to claim 10, further comprising establishing communication with the cloud service according to a communication schedule.

12. The method according to claim 11, wherein establishing communication includes establishing communication according to a continuously repeating time interval.

13. The method according claim 10, further comprising receiving configuration information from the cloud service.

14. The method according to claim 10, further comprising:
receiving, by at least one computer system provided by the cloud service, identification information from the at least one power device;
receiving, by the at least one computer system, the secured information from the at least one power device;
identifying a key using the identification information; and
decoding the secured information using the key.

15. The method according to claim 14, further comprising:
identifying, by the at least one computer system, the power device based on the identification information;
associating, by the at least one computer system, the identification information with the secured information; and
associating, by the at least one computer system, the identification information with a user based on historical information previously received in a separate communication.

16. The method according to claim 10, further comprising:
providing, by at least one computer system, a user interface;
receiving user information via the user interface; and
associating the user information with historical information associated with the identification information and previously received in a separate communication from the at least one power device.

17. The method according to claim 16, further comprising:
identifying a plurality of power devices as having a same internet protocol address; and
associating, responsive to identifying the plurality of power devices as having the same internet protocol address, the user information with identification information for each of the plurality of power devices.

18. The method according to claim 16, further comprising:
providing an authentication challenge via the user interface; and
receiving an authentication response.

19. A non-transitory computer readable medium having stored thereon sequences of instruction for transmitting data from a power device to a cloud service including instructions that will cause at least one processor of a power device to:

provide, according to a reporting schedule, identification information directly to a cloud service via the network interface;

provide, according to the reporting schedule, secured information directly to the cloud service, the secured information being descriptive of performance of the at least one power device;

detect occurrence of an event of importance;

assign, responsive to detecting that the event of importance has occurred, a value to the event of importance corresponding to a level of importance;

compare the value to a threshold; and transmit, responsive to detecting that the event of importance has occurred and comparing the value to the threshold, event information directly to the cloud service, the event information being descriptive of the event of importance.

20. The computer readable medium according to claim 19, wherein the instructions will further instruct the at least one processor to establish communication with the cloud service according to a communication schedule.

21. The computer readable medium according claim 19, wherein the instructions will further instruct the at least one processor to receive configuration information from the cloud service.

\* \* \* \* \*